Sept. 6, 1966 C. H. KELLER 3,271,612
FLASH DEVICE
Filed March 19, 1963

INVENTOR.
CHARLES H. KELLER
BY
ATTORNEY

United States Patent Office 3,271,612
Patented Sept. 6, 1966

3,271,612
FLASH DEVICE
Charles H. Keller, Sunnyvale, Calif., assignor to PEK Labs, Inc., Sunnyvale, Calif., a corporation of California
Filed Mar. 19, 1963, Ser. No. 266,316
3 Claims. (Cl. 313—220)

This invention relates to flash devices, and more particularly to a flash device for forming a line source of great brightness per unit length along its luminous portion.

Conventional flash lamps forming line sources of intense illumination are generally deployed, either directly or with a reflector, to illuminate a selected area, space or object. The amount of illumination provided by such a flash lamp is a function of the energy input applied, which in turn is limited by the lamp geometry and the safe current rating of the electrodes.

To increase the illumination provided by a flash lamp without increasing the current, so that the safe current carrying capacity of the electrodes is not exceeded, is usually accomplished by increasing the luminous length, i.e., the electrode spacing. This permits the application of greater energy without increase of current and thereby provides greater total illumination without materially changing the illumination per unit length of the luminous portion of the lamp.

This method of increasing the total illumination of a flash lamp is suitable for many applications, particularly when suitable reflectors are used to illuminate a distant object or area, but has been found to be of little advantage for the illumination of small objects, particularly when simple and easily manufactured reflectors are to be used.

With the advent of lasers (light amplification by stimulated emission of radiation), which require light to pump up the energy state of the active material, efficient optical coupling of the flash lamp to the active material is most desirable. Most lasers, such as for example a ruby laser, are usually shaped in the form of a cylinder with transparent walls and reflective end faces. Pumping is accomplished by radiating light from a flash tube through the transparent wall. For efficient optical coupling, a reflector of elliptical shape and straight side walls is utilized to focus the light given off by the luminous length of a flash lamp on the active laser material. The line source is placed at one focal point of the reflector and extends parallel to the side walls and the laser material is placed at the other focal point to extend parallel to the line source. Since the sides of such elliptical reflectors are straight, the useful light provided by the flash lamp is the illumination from the portion of length of the line source which is equal to the length of the laser material. Accordingly, to increase the illumination of a laser it is desirable to increase not the total light output but rather the light output per unit length of the flash lamp.

It is accordingly a primary object of this invention to provide a new and improved flash lamp having an increased luminous output per unit length.

It is a further object of this invention to provide a flash lamp of a maximum selected current rating which has a greater brightness per unit length than has been possible heretofore.

It is another object of this invention to provide a flash lamp particularly suited for pumping the active material of a laser.

It is still another object of this invention to provide an intense line source of illumination which is substantially uniform along its length and which provides, for its length and current rating, a greater luminous output than lamps constructed heretofore.

It is still a further object of this invention to provide an improved flash lamp whose physical luminous length and current rating are small compared with its output of radiant energy.

Other objects and a better understanding of the invention may be had by reference to the following description, taken in conjunction with the accompanying drawings, in which.

Figure 1:
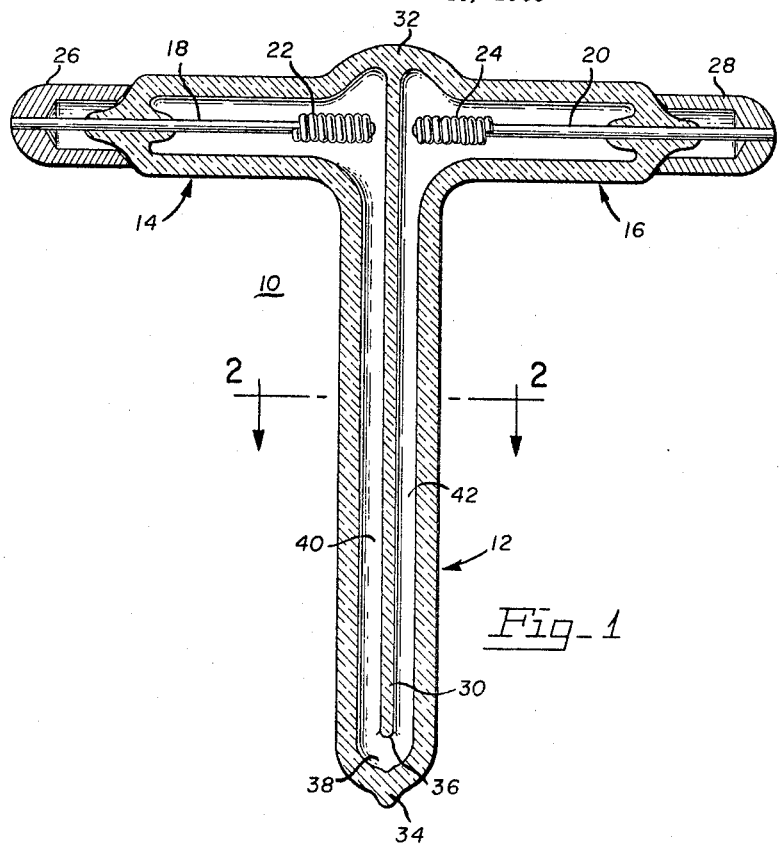
FIG. 1 is a cross-sectional view of the flash device of this invention.
Figure 2:
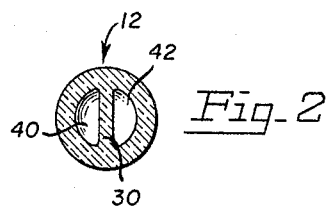
FIG. 2 is a sectional view taken along line 2—2 of FIG. 1.

As is well known in this art, flash lamps comprise generally an anode and a cathode sealed in a glass or quartz envelope containing a relatively low pressure atmosphere such as Xenon gas which, at room temperature, may typically be between $\frac{1}{7}$ and $\frac{4}{7}$ atmospheres. The anode and cathode are separated by a path in the envelope which is illuminated during discharge when energy is applied to the electrodes. In most prior art lamps, the arc discharge path between the electrodes is linear so that the path length is substantially equal to the electrode separation.

Referring now to the drawing, there is shown a flash lamp 10 constructed in accordance with this invention. Lamp 10 includes a path envelope 12 formed of quartz for well understood reasons, which is provided with axially aligned stems 14 and 16 at right angles to the direction of extension of path envelope 12. Envelope 12 together with stems 14 and 16 form a lamp envelope of T-shaped configuration in which the leg of the T comprises the path envelope and the bar of the T comprises the two stems.

Mounted in stem 14 is an anode 18 of refractory metal, which is usually tungsten. As illustrated, anode 18 is rod-shaped and sealed to the end of stem 14. Likewise, mounted in stem 16 is a cathode 20 which is made of the same material as the anode and may, but need not be, of the same rod-like configuration. Cathode 20 is sealed to the end of stem 16. The arc ends of electrodes 18 and 20 have wound therearound a wire of refractory material such as tungsten shown at 22 and 24 respectively. The purpose of wires 22 and 24 is to increase the surface area of the electrode arc ends for more efficient radiating and cooling.

By way of example, electrodes 18 and 20 may be formed of tungsten rods having a diameter of 0.60 inch and having a length from the arc tip to the end of the respective mounting stem of 0.875 inch. Typical for such electrodes, a tungsten wire of about 0.028 inch diameter may be utilized which is closely wound to cover an axial electrode length of 0.25 inch. For best operation, the arc ends of electrodes 18 and 20, together with wires 22 and 24, are ground to a smooth radius.

Electrodes 18 and 20 are respectively electrically connected to lamp connectors 26 and 28 mounted to the outside of cap stems 14 and 16 to provide convenient means for applying electrical energy from a high voltage power supply (not shown) to initiate the discharge arc.

Path envelope 12 is tubular in construction and has a central partition 30 which extends all the way from the upper portion 32, forming the midpoint of axially aligned stems 14 and 16, to the bottom of envelope 12. Partition 30 is sealed to upper part 32 and the sides of envelope 12 but terminates, before reaching the lower end 34 of envelope 12, in an edge 36 to form a gap 38 to form a pair of connected rectilinear channels 40 and 42 of semicircular cross section. Accordingly, a discharge or flash path is defined which extends from anode 18, along channel 40 of semicircular cross section, through gap 38, and channel 42 also of semicircular cross section, to cathode 20.

For a typical lamp 10, path envelope 12 may have an outer diameter of 9.5 millimeters and a wall thickness of 2 millimeters, and a partition having a thickness of 1 millimeter. For a lamp having a luminous length (length of envelope 12) of 6 inches the maximum energy input is typically 1,500 watt seconds and the self flash voltage is about 5,000 volts.

It is now readily seen that for a selected maximum energy input, the total light output provided corresponds approximately to a lamp having an electrode separation of twice the luminous length of lamp 10. In other words, lamp 10 is so constructed that its flash path doubles back upon itself so that the luminous output per unit length of envelope 12 has almost doubled. It has been found that compressing the luminous length by folding the flash path back upon itself results in a highly satisfactory flash lamp providing a considerably greater output of illumination per unit length than available from prior art lamps of similar current rating.

It is to be understood that many variations of the teaching made herein will become immediately obvious to those skilled in the art. For example, envelope 12 may be constructed with a plurality of partitions which are alternately open on opposite ends of the envelope to form gaps. Consequently, a flash path is provided which doubles back upon itself a multiple number of times to dissipate the applied energy in a physically short or compressed luminous path.

What is claimed is:

1. An arc discharge flash lamp comprising: a sealed T-shaped envelope defining a T-bar portion and a T-leg portion containing a gaseous substance at less than atmospheric pressure, a partition extending centrally along said T-leg portion with the upper end thereof extending into and being sealed transversely across said T-bar portion to form two communicating chambers and the lower end of said partition forming a communication gap with the lower end of said T-leg portion for communicating the partitioned sections of said envelope; a single field emission anode mounted in one end of said T-bar portion and extending into said T-bar portion with its arc end portion facing one side of said partition; and a single field emission cathode mounted in the other end of said T-bar portion and extending into said T-bar portion with its arc end portion facing on the other side of said partition.

2. An arc discharge flash lamp in accordance with claim 1, in which said anode and said cathode are comprised of refractory metal.

3. An arc discharge flash lamp in accordance with claim 1, in which said anode and said cathode are of rod-like configuration and which include a wire of refractory metal which is wound around said arc end portions.

References Cited by the Examiner

UNITED STATES PATENTS

| | | | |
|---|---|---|---|
| 850,065 | 4/1907 | Shoemaker | 313—220 X |
| 2,006,081 | 6/1935 | Anderson | 313—185 |
| 2,102,190 | 12/1937 | Barclay | 313—161 X |
| 2,121,333 | 6/1938 | Barclay | 313—204 X |
| 2,179,606 | 11/1939 | Anderson | 315—326 |
| 2,731,577 | 1/1956 | Floyd | 313—146 |
| 3,067,357 | 12/1962 | Fridrich | 313—134 |

JAMES W. LAWRENCE, *Primary Examiner.*

GEORGE N. WESTBY, *Examiner.*

S. D. SCHLOSSER, R. SEGAL, *Assistant Examiners.*